United States Patent
Gomes et al.

(10) Patent No.: US 7,908,376 B2
(45) Date of Patent: Mar. 15, 2011

(54) DATA PATH ACCELERATION OF A NETWORK STACK

(75) Inventors: Fabian A. Gomes, Irvine, CA (US); Leo Kaplan, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 89 days.

(21) Appl. No.: 12/183,935

(22) Filed: Jul. 31, 2008

(65) Prior Publication Data

US 2010/0027545 A1  Feb. 4, 2010

(51) Int. Cl.
*G06F 15/16* (2006.01)

(52) U.S. Cl. ......... 709/226; 709/228; 709/246; 370/352

(58) Field of Classification Search ............ 709/226, 709/228, 246; 370/352, 390
See application file for complete search history.

(56) References Cited

U.S. PATENT DOCUMENTS

| | | | |
|---|---|---|---|
| 7,266,120 B2 * | 9/2007 | Cheng et al. | 370/390 |
| 7,340,535 B1 * | 3/2008 | Alam | 709/246 |
| 7,376,125 B1 * | 5/2008 | Hussain et al. | 370/352 |
| 7,512,129 B1 | 3/2009 | Favor et al. | |
| 2003/0058872 A1 | 3/2003 | Berggreen et al. | |
| 2003/0065812 A1 | 4/2003 | Beier et al. | |
| 2004/0213189 A1 | 10/2004 | Alspaugh et al. | |
| 2005/0018685 A1 | 1/2005 | Butler et al. | |
| 2006/0002392 A1 | 1/2006 | Malerevich | |
| 2007/0291755 A1 * | 12/2007 | Cheng et al. | 370/390 |
| 2008/0077705 A1 | 3/2008 | Li et al. | |
| 2008/0261656 A1 | 10/2008 | Bella et al. | |
| 2009/0092136 A1 | 4/2009 | Nazareth et al. | |

FOREIGN PATENT DOCUMENTS

WO   2006/080898 A1   8/2006

OTHER PUBLICATIONS

U.S. Appl. No. 12/021,409 Non-Final Office Action mailed Oct. 29, 2010, 27 pages.
Gomes, Fabian A., "Optimizing Incremental State Saving and Restoration", The University of Calgary, A Dissertation Submitted to the Faculty Graduate Studies in Partial Fulfillment of the Requirements for the Degree of Doctor of Philosophy, Department of Computer Science, (Apr. 1996), 217 pages.
U.S. Appl. No. 12/021,409, Final Office Action mailed May 14, 2010.
U.S. Appl. No. 12/021,409, Non-Final Office Action mailed Sep. 21, 2009.

* cited by examiner

*Primary Examiner* — Khanh Q Dinh
(74) *Attorney, Agent, or Firm* — Brake Hughes Bellermann LLP

(57) ABSTRACT

An apparatus may include a flow cache module that is arranged and configured to derive, at runtime, a custom sequence of code segments for packets belonging to a specific connection using a first packet of the specific connection and a parser module that is arranged and configured to identify packets as belonging to the specific connection using an Internet Protocol (IP) tuple of the packets, where the flow cache module is arranged and configured to apply the custom sequence of code segments to the identified packets.

12 Claims, 2 Drawing Sheets

DATA PATH ACCELERATION OF A NETWORK STACK

TECHNICAL FIELD

This description relates to data path acceleration of a network stack.

BACKGROUND

Data packets may be communicated through wide area networks and local area networks. Devices may be used to connect one network with another network and/or to connect a network with one or more other devices. For example, a device or a computing network system within a computer network may be an end node, which may initiate and/or terminate a connection. A device or a computer networking system within the computer network may be an intermediate node, which may be responsible for transferring data to another node in the computer network. Data packets may be communicated through these devices that function as intermediate nodes.

SUMMARY

The details of one or more implementations are set forth in the accompanying drawings and the description below. Other features will be apparent from the description and drawings, and from the claims.

DETAILED DESCRIPTION

In general, a system may be used to route and bridge packets that are communicated between networks and/or to route and bridge packets that are communicated between a network and one or more devices. For example, a system may be used to route and bridge packets that are incoming from a first network and outgoing to a second network. The system may include a processor that may accelerate the flow of packets through a device by determining if the packets belong to a specific connection and, if so, then applying a custom sequence of code segments to the packets, where the custom sequence of code segments may be derived at runtime based upon the processing performed on the first packet in the specific connection. In this manner, packets identified as belonging to a specific connection may bypass the operating system network stack and may be accelerated through the device, thus increasing the throughput of the packets.

In one exemplary implementation, the packets may be received on wide area network (WAN) and/or local area network (LAN) interfaces. The processor may implement the packet acceleration using flow cache software (e.g., a computer program product), which may include executable code that is configured to accelerate the packets through a network device.

Using the flow cache software to process the data packets may enable the data packet processing to be offloaded from the network stack. The flow cache software may be configured to handle multiple data packet flows and to provide a variety of modification functions including network address translation (NAT), point-to-point protocol over Ethernet (PP-PoE) termination, virtual local area network (VLAN) bridging, multicast, rate limiting, color marking and shaping.

Figure 1:
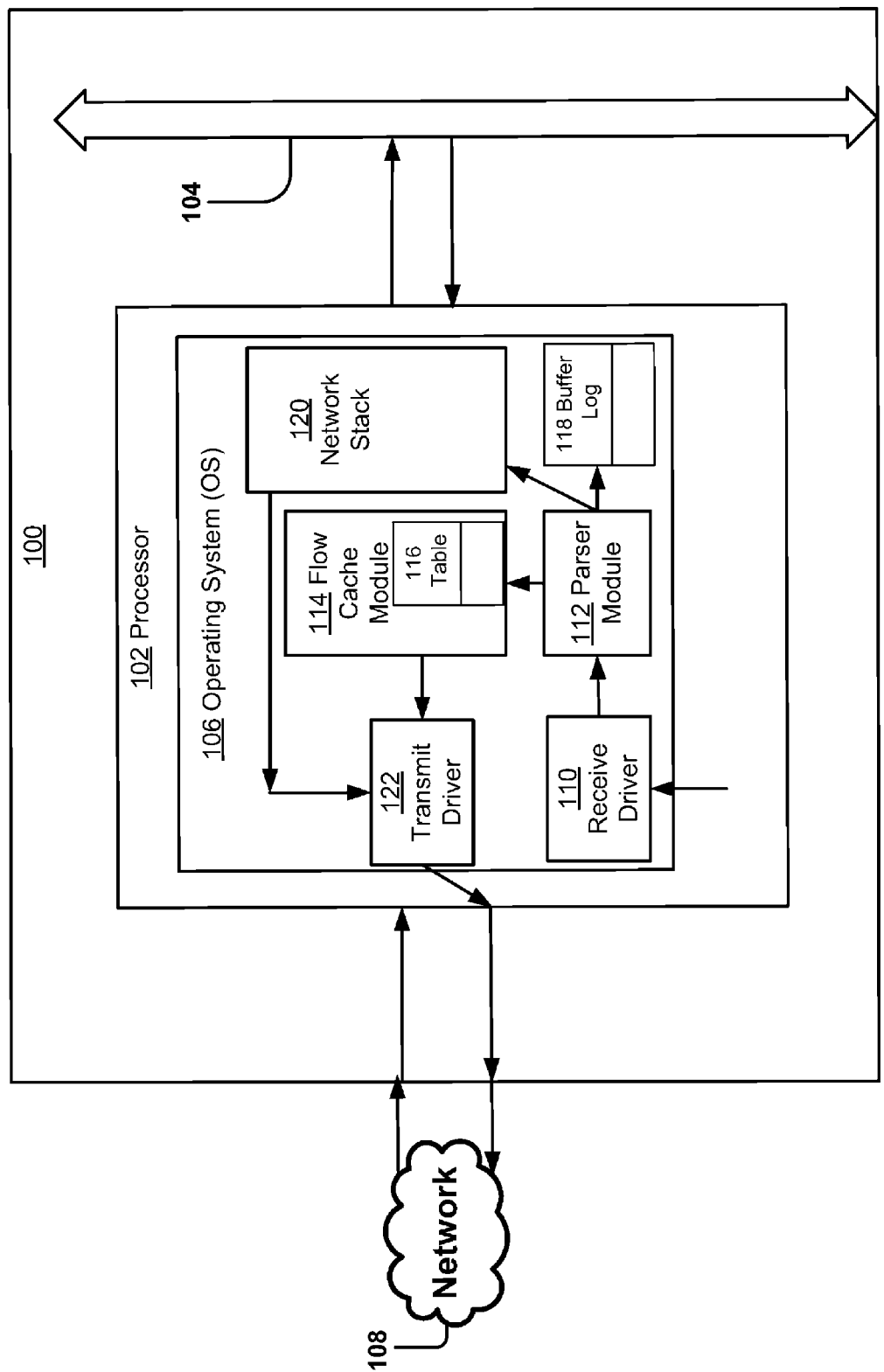
FIG. 1 is an exemplary block diagram of a system for processing packets.

Referring to FIG. 1, a system 100 may be used for processing packets. System 100 includes a processor 102 and a bridge 104 that communicates with and enables communication between the processor 102 and other components (not shown). The processor 102 includes an operating system 106. A network 108 communicates with the system 100.

In one exemplary implementation, system 100 may be implemented on a single chip and used in multiple different devices and solutions. For example, system 100 may be a highly integrated single chip integrated access device (IAD) solution that may be used in gateways, routers, bridges, cable modems, digital subscriber line (DSL) modems, other networking devices, and any combination of these devices in a single device or multiple devices. System 100 may be configured to handle multiple data flows. In other exemplary implementations, system 100 may be implemented on multiple chips that are configured to operate in concert together.

Network 108 may include one or more networks that communicate with system 100. For instance, network 108 may include multiple different networks that communicate with system 100. Network 108 may include a WAN, a LAN, a passive optical network (PON), a gigabyte passive optical network (GPON), and any other type of network. System 100 may provide an interface between different networks 108 to process upstream data packets (e.g., LAN to WAN) and downstream data packets (e.g., WAN to LAN) between the networks 108. Although FIG. 1 illustrates an incoming data path and an outgoing data path between the network 108 and system 100, there may be multiple different data paths and wired and wireless ports to communicate with different multiple networks 108.

Processor 102 may include a processor that is arranged and configured to process packets. Processor 102 may be configured to process one or more streams of packets. In one implementation, processor 102 may include a single threaded, single processor solution. In another exemplary implementation, processor 102 may include a multi-threaded processor solution. Processor 102 may be configured to perform other functions in addition to packet processing.

Processor 102 may include an operating system (OS) 106. For example, operating system 102 may include Linux-based OS, a MAC-based OS, a Microsoft-based OS such as a Windows® OS or Vista OS, embedded Configurable operation system (eCos), VxWorks, Berkeley Software Distribution (BSD) operating systems, QNX operating system, or any other type of OS.

The OS 106 may include a receive driver 110, a parser module 112, a flow cache module 114 having a table 116, a buffer log 118, a network stack 120 and a transmit driver 122. The receive driver 110 may be configured to receive packets that are transmitted by the network 108 to the system 100. The receive driver 110 may include a data buffer (not shown) to store the received packets. For example, the data buffer may be referred to as "mbuf" in some Oss or "skbuff" in the Linux OS. The receive driver 110 may communicate the packets to the parser module 112.

The parser module 112 may be configured to identify packets using an Internet Protocol (IP) tuple of the packets. The IP tuple may include one or more fields of the packet. In one exemplar implementation, the IP tuple may include an IP source address, an IP destination address, an IP protocol type, a source port, and a destination port. For example, the source port and the destination port may be the source and destination ports of the upper transport protocol, e.g. transmission control protocol (TCP) or user datagram protocol (UDP).

The parser module 112 may be configured to extract the IP tuple from the packets by quickly parsing the received packet header. For instance, the parser module 112 may extract the IP tuple from the received Layer-2 header(s). The parser module 112 may be configured to compute a hash on the IP-tuple. The parser module 112 may use the computed hash to look up in the table 116 to see if an entry exists in the table 116 for that IP tuple. The table 116 may store connections whose packets can be accelerated by the flow cache module 114, where the table information is accessible by a hash function applied to the IP tuple. If an entry in the table 116 exists, this may be referred to as a flow cache hit. If an entry in the table 116 does not exist, this may be referred to as a flow cache miss. In another exemplary implementation, the tuple may be a couple of layer 2 fields, where the parser module 112 may be configurable to extract these layer 2 fields.

If an entry does not exist in the table 116, then information about the packet may be logged in the buffer log 118. For instance, in one exemplary implementation, the layer-2 headers, the offset of the IP header in the received packet and specific fields of the IP header, namely the time to live (TTL) field, the DSCP field, and the IP tuple fields may be logged in a Buffer Log, along with the received packet's IP tuple hash value. The received packet may then follow the normal path in the network stack by flowing to the network stack 120 until it reaches the transmit driver 122. At the transmit driver 122 if the packet has the buffer log still associated, then the packet is handed back to the flow cache module 114. The flow cache module 114 logs the transmit headers into the buffer log, computes a custom sequence of code segments using the received and transmit logged packet data, and an entry is created in the table 116 against the received IP tuple hash, to contain the custom sequence of code segments and the buffer log of received and transmit headers. The packet is then returned to the transmit driver 122 which forwards the packet back to the network 108 to its next destination.

If an entry does not exist in the table 116, then it may be that the received packet is the first packet received for a specific connection. If this first packet of the connection is determined to be a candidate for flow cache acceleration, then an entry may be created in the table 116 such that subsequent packets for this specific connection may be flow cache hits when the parser module 112 checks to see whether or not an entry exists in the table 116. The packet may be tagged and tracked as it is processed by the network stack 120 so that the sequence of processing steps may be determined for this packet.

The buffer log 118 may be directly or indirectly associated with the received data packet. In one exemplary implementation, the receive driver 110 may use the buffer log 118 for storage of the packets. One implementation of a direct association is to have some reserved headroom in the buffer log 118. For instance, if the maximum data buffer is 1800 bytes in size, then a 2048 byte packet buffer could accommodate both a buffer log in the first 248 bytes and the data storage for the received packet. The buffer log 118 could be allocated at 2048 aligned memory making the conversion from a pointer into the data buffer to the buffer log 118 a simple clear operation of the lower 11 bits. In an alternate exemplary implementation, the buffer log 118 could indirectly associate the with the data buffer context object.

Prior to checking for an IP tuple flow cache hit, the parser module 112 may be configured to check other information related to the packet. For example, the parser module 112 may be configured to check the layer 2/3 headers to exclude specific packet types from even determining whether or not an entry exists in the table 116. For example, the parser module 112 may check the layer 2/3 headers to exclude packets such as, for instance, broadcast or multicast packets, packets pertaining to layer-2 discovery protocols, packets belonging to specific sessions, keep alive control protocol packets, fragmented data packets, and/or data packets with in-band control signaling such as RST/FIN bits in TCP protocol. These types of data packets may be treated as requiring special network stack handling and passed directly to the network stack 120 without logging the IP-Tuple. Theses types of packets may be made part of an exclusion list that the parser module 112 checks against before determining whether an entry exists in the table 116. Alternatively, the parser module 112 may check the exclusion list at or near the same time that it is checking the table 116 for an entry.

A packet that did not belong to an exclusion list and has a buffer log associated with it, is assumed to be a candidate for acceleration (e.g., software acceleration) by the flow cache module 114. As the packet passes through the network stack 120, this assumption may become invalid, if for instance, the packet passed through special protocol processing such as an application level gateway. Under such a scenario, the buffer log 118 may be released (if indirectly associated) and the packet is deemed as normal processing.

Packets that are to be forwarded to the next node may be given to the transmit driver 122. At the transmit driver 122, if the packet is still tagged as a candidate for acceleration, then the offset of the IP header may be computed using the protocol field of each layer 2 encapsulation. The logged receive header information and the transmit header information may be used to calculate or deduce information about the packet. The flow cache module 114 may be configured to determine information about the processing of the packet using the logged receive header information and the transmit header information.

For example, the flow cache module 114 may determine that the packet belongs to a routed connection if the TTL was decremented. The flow cache module 114 may determine that the packet belongs to a NATed connection (i.e., connection that went through network address translation processing) if the receive and transmit IP tuples differ. The flow cache module 114 may determine that the packet belongs to a bridged or switch connection if the layer 2 headers differ and it was not routed. The flow cache module 114 may determine that the packet may need specific QOS layer-2 tagging or DSCP IP modifications. The flow cache module 114 also may determine other information such as the priority and destination port, channel, transmit queue, and other information as well.

The flow cache module 114 may be configured to translate the applicable determinations into a sequence of defined operations that need to be applied to any future packets identified by their IP tuple as belonging to this specific connection. The flow cache module 114 may be configured to derive, at runtime, a custom sequence of code segments for packets belonging to the specific connection using the information derived about the first packet of the connection. The operation sequence and the relevant data may be entered into a flow cache object, which may inserted into the table 116 using the receive IP tuple as a hash key. In this manner, the flow cache module 114 creates a custom stack for the specific connection.

Any subsequent packets, received at the receive driver 110, that have an IP tuple hit in the flow cache table 116 will simply execute the custom sequence of operations stored in the table 116. Thus, these subsequent packets would not need to be processed by the network stack 120 and would bypass the network stack 120. In one implementation, a last operation in the custom sequence of code segments may be an invocation to enqueue the packet the transmit driver 122.

In one exemplary implementation, the flow cache module 114 may be configured to construct the custom stack for the specific connection as a threaded code sequence using C language goto labels as values. The C-Language compiler supports an extension to the C Language, called "Labels as Values". This construct permits a C label construct to be used as a value. A code segment may be defined as a set of C statements and uniquely identified by a label. An array of labels then specifies the list of code segments to be executed. The last C statement in a code segment may be a special goto statement whose destination label is fetched from the next index of the array of labels, thereby threading the code segments. One special code segment may be defined to return and its identifying label may be the last element of the array of labels.

The flow cache module 114 may implement several general code segments to accomplish operations such as, for example, remove all layer 2 headers, insert new layer 2 headers, replace bytes at specific offset, decrement TTL, mangle IP DSCP, mangle Source-NAT, mangle D-NAT, incrementally update layer 3 checksum, incrementally update layer 4 checksum, replicate a packet, data cache invalidate of only data touched, and enqueue at transmit device, return, and other operations and combinations of operations. The code segments may be written devoid of any conditional tests or function calls. Using the receive and transmit headers information, the appropriate set of code sequences may be deduced and the thread of their labels is saved in the flow cache entry in table 116 along with other information that may be needed by each code segment.

Figure 2:
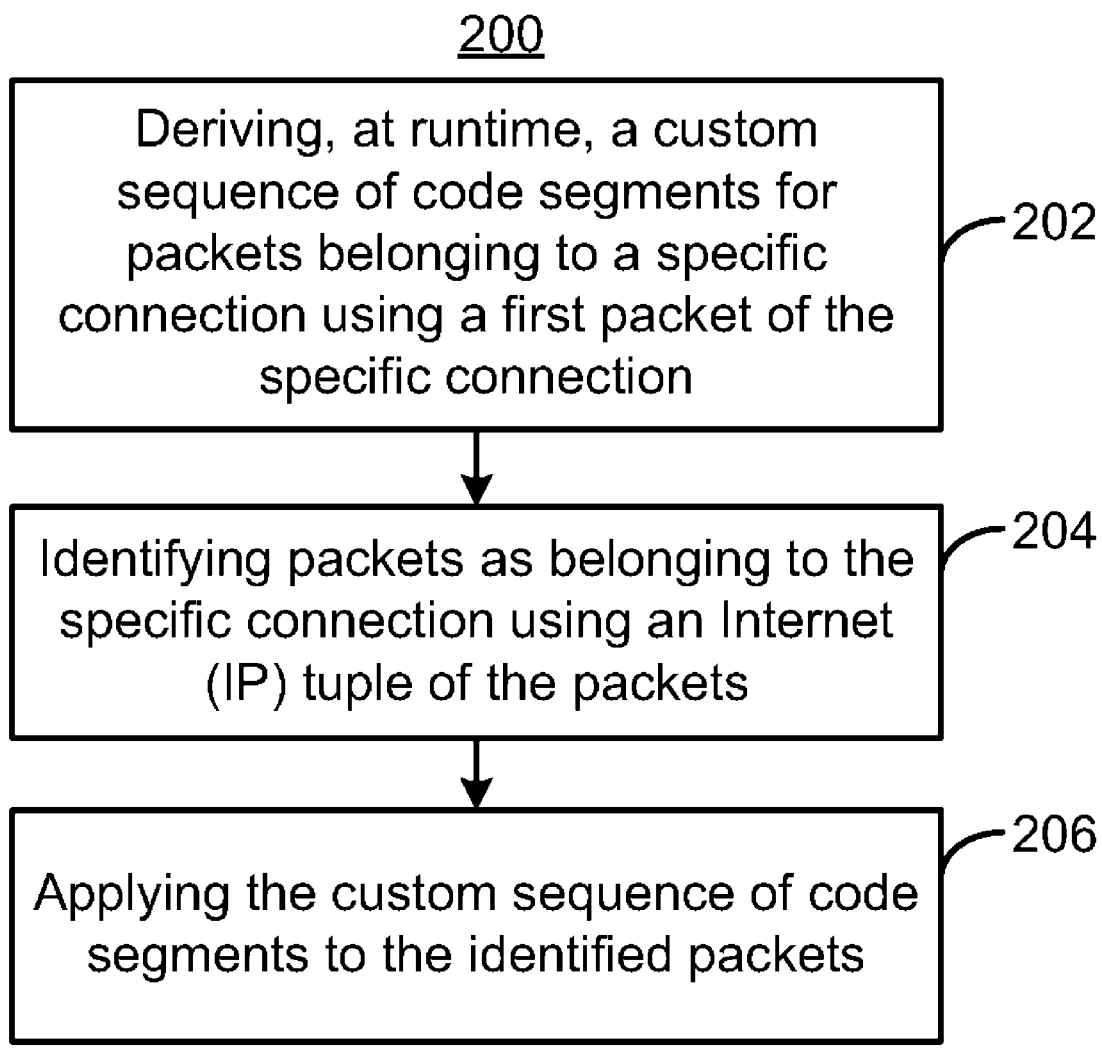
FIG. 2 is an exemplary flow chart of a process for processing packets.

Referring to FIG. 2, a process 200 may be used to process packets. Process 2900 includes deriving, at runtime, a custom sequence of code segments for packets belonging to a specific connection using a first packet of the specific connection (202), identifying packets as belonging to the specific connection using an IP tuple of the packets (204) and applying the custom sequence of code segments to the identified packets (206).

In one exemplary implementation, process 200 may be implemented by the parser module 112 and flow cache module 114 of FIG. 1. In one implementation, parser module 112 and the flow cache module 114 may be implemented as software components that act on the packets to accelerate the packets through the system 100.

For example, the flow cache module 114 may be configured to derive, at runtime, a custom sequence of code segments for packets belonging to a specific connection using a first packet of the specific connection (202). In this manner, the flow cache module 114 may use information from the receive header and the transmit header of the first packet to determine the custom sequence of code segments. The flow cache module 114 may construct a custom stack for the specific connection such that the subsequent packets for the specific connection may bypass the network stack (e.g., network stack 120 of FIG. 1).

The parser module 112 may be configured to identify packets as belonging to the specific connection using the IP tuple of the packets (204). The parser module 112 may parse the headers of the received packets to extract the IP tuple. The parser module 112 may compute a hash key using the IP tuple and check the hash key against the table 116 to determine whether or not an entry exists in the table 116. The flow cache module 114 may apply the custom sequence of code segments to the identified packets (206).

In one exemplary implementation, the use of the system 100 having the parser module 112 and the flow cache module 114 and the process 200 has been demonstrated to obtain a 6-fold performance gain over a system simply using just the network stack to process the packets. A system 100 that dynamically constructed a custom threaded code sequence, where all further data packets were redirected via a flow cache hit to the custom stack was able to sustain wireline downstream rates of 123,000 packets per second on a 100 Mbits downstream VDSL connection. A 6-fold performance gain over the currently used network stack in the DSL software reference was demonstrated using a Flow cache based software acceleration.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus including instructions tangibly embodied on a non-transitory computer-readable storage medium, the apparatus comprising:
   a flow cache module that is arranged and configured to construct a custom stack and to derive, at runtime, a custom sequence of code segments for packets belonging to a specific connection using a first packet of the specific connection; and
   a parser module that is arranged and configured to identify packets as belonging to the specific connection using an Internet Protocol (IP) tuple of the packets and that is arranged and configured to inspect headers of the packets,
   wherein the flow cache module is arranged and configured to use the custom stack and to apply the custom sequence of code segments to the identified packets and is arranged and configured to exclude certain packet types as belonging to the specific connection based on the inspected headers.

2. The apparatus of claim 1 wherein the flow cache module is arranged and configured to construct the custom stack for the specific connection as a threaded code sequence using C language goto labels as values.

3. The apparatus of claim 1 wherein the parser module is arranged and configured to parse the headers of the packets to extract the IP tuple.

4. The apparatus of claim 1 wherein the IP tuple includes a source address, a destination address, a protocol type, a source port and a destination port.

5. A method comprising:
   constructing a custom stack and deriving, at runtime, a custom sequence of code segments for packets belonging to a specific connection using a first packet of the specific connection;
   identifying packets as belonging to the specific connection using an Internet Protocol (IP) tuple of the packets;
   using the custom stack to apply the custom sequence of code segments to the identified packets;
   inspecting headers of the packets; and
   excluding certain packet types as belonging to the specific connection based on the inspected headers.

6. The method as in claim 5 wherein constructing the custom stack comprises constructing the custom stack for the specific connection as a threaded code sequence using C language goto labels as values.

7. The method as in claim 5 wherein identifying the packets comprises parsing the headers of the packets to extract the IP tuple.

8. The method as in claim 5 wherein the IP tuple includes a source address, a destination address, a protocol type, a source port and a destination port.

9. A computer program product for performing packet acceleration, the computer program product being tangibly embodied on a non-transitory computer-readable medium and including executable code that, when executed, is configured to cause at least one data processing apparatus to:
   construct a custom stack and derive, at runtime, a custom sequence of code segments for packets belonging to a specific connection using a first packet of the specific connection;
   identify packets as belonging to the specific connection using an Internet Protocol (IP) tuple of the packets;
   use the custom stack to apply the custom sequence of code segments to the identified packets;
   inspect headers of the packets; and
   exclude certain packet types as belonging to the specific connection based on the inspected headers.

10. The computer program product of claim 9 wherein the executable code is configured to cause the data processing apparatus to construct the custom stack for the specific connection as a threaded code sequence using C language goto labels as values.

11. The computer program product of claim 9 wherein the executable code is configured to cause the data processing apparatus to parse the headers of the packets to extract the IP tuple.

12. The computer program product of claim 9 wherein the IP tuple includes a source address, a destination address, a protocol type, a source port and a destination port.

* * * * *